(12) United States Patent
Showcatally (10) Patent No.: US 8,116,071 B2
(45) Date of Patent: Feb. 14, 2012

(54) UTILITY PIT METER AMR DEVICE WITH MULTIPLE MOUNTING PROVISIONS

(75) Inventor: Shawn Showcatally, Mankato, MN (US)

(73) Assignee: Itron, Inc., Liberty Lake, WA (US)

( * ) Notice: Subject to any disclaimer, the term of this patent is extended or adjusted under 35 U.S.C. 154(b) by 853 days.

(21) Appl. No.: 12/104,244

(22) Filed: Apr. 16, 2008

(65) Prior Publication Data

US 2008/0316050 A1 Dec. 25, 2008

Related U.S. Application Data

(60) Provisional application No. 60/923,620, filed on Apr. 16, 2007.

(51) Int. Cl.
*H02B 1/00* (2006.01)
*G08B 23/00* (2006.01)

(52) U.S. Cl. .................... 361/664; 361/665; 340/870.02

(58) Field of Classification Search ......................... None
See application file for complete search history.

(56) References Cited

U.S. PATENT DOCUMENTS

| | | | | |
|---|---|---|---|---|
| 5,298,894 A * | 3/1994 | Cerny et al. | ............. | 340/870.02 |
| 5,416,475 A * | 5/1995 | Tolbert et al. | ............. | 340/870.02 |
| 6,218,995 B1 * | 4/2001 | Higgins et al. | ............. | 343/719 |
| 6,369,769 B1 * | 4/2002 | Nap et al. | ............. | 343/719 |
| 6,378,817 B1 * | 4/2002 | Bublitz et al. | ............. | 248/200 |
| 6,568,645 B2 | 5/2003 | Maddox | | |
| 6,617,976 B2 * | 9/2003 | Walden et al. | ............. | 340/870.02 |
| 7,085,128 B2 * | 8/2006 | Wilfong | ............. | 361/665 |
| 7,202,828 B2 * | 4/2007 | Zehngut et al. | ............. | 343/719 |
| 7,446,672 B2 * | 11/2008 | Johnson et al. | ............. | 340/870.02 |
| 7,448,235 B2 * | 11/2008 | Ely et al. | ............. | 70/2 |
| 7,891,246 B2 * | 2/2011 | Lander | ............. | 73/592 |
| 2008/0169392 A1 * | 7/2008 | McClure et al. | ............. | 248/226.11 |

* cited by examiner

*Primary Examiner* — Boris Chervinsky
(74) *Attorney, Agent, or Firm* — Dority & Manning, P.A.

(57) ABSTRACT

An automatic meter reading (AMR) system device is adapted to be mounted in a utility meter pit. The device includes a housing constructed to at least partially enclose at least one portion of an AMR system device. The housing is integrally formed with at least two different mounting members selected from among: a rod mounting member that includes a port sized and shaped to receive a rod to facilitate mounting of the device in the pit, a wall mounting member that includes a wall-mount provision that facilitates mounting of the device to a wall of the pit, a tie mounting member constructed to receive at least one tie fastener that facilitates mounting of the device to a structure in the pit, and a lid mounting portion constructed to facilitate mounting of the device to a lid of the pit.

10 Claims, 11 Drawing Sheets

UTILITY PIT METER AMR DEVICE WITH MULTIPLE MOUNTING PROVISIONS

PRIOR APPLICATIONS

This Application claims the benefit of U.S. Provisional Application No. 60/923,620, filed Apr. 16, 2007, which is incorporated by reference herein in its entirety.

FIELD OF THE INVENTION

The invention relates to a mounting system for meters and meter-related devices. More particularly, the invention describes a mounting system that provides a user with a plurality of options for installing a meter in a utility-meter pit environment.

BACKGROUND OF THE INVENTION

Utility meters, such as water meters, are often located in below-ground pits. This kind of meter-pit installation is commonly used in geographic regions that are not typically subjected to freezing conditions and in which many homes do not have full-slab foundations. In such homes, there is no basement or access space for mounting a water meter indoors.

Automatic Meter Reading (AMR) systems are generally known. Such systems are adapted to allow the communication of meter consumption data without a utility company operator physically visiting the meter to acquire consumption data. Often, one or more AMR devices are communicatively coupled to a utility endpoint. One such device is an AMR endpoint that is an electronic components adapted to communicate meter consumption data and other data.

A meter located at the bottom of a pit may be communicatively coupled to an AMR endpoint that converts consumption data collected by the meter to a signal. In one example, the AMR endpoint is adapted to independently communicate the signal in the form of a radio frequency (RF) transmission to a device that collects and record consumption data.

Meter pit environments may vary significantly. Therefore, mounting an AMR device in meter pits presents a variety of challenges. For example, meter pits may be constructed of metal, concrete, or plastic. For metal pits, AMR devices should not touch the walls of the pit, because metal walls may interfere with the communications. Therefore, for metal pits, an AMR device should be secured without touching the walls of the pit. This may be accomplished by mounting an AMR device to a vertically extending PVC pipe or a stake, such that the AMR device is both elevated and out of contact with the pit walls. For concrete or plastic pits, an AMR device may be attached directly to the pit wall. For some pits, it is advantageous to mount an AMR device to a lid of the pit.

Known AMR devices generally include a single mounting accessory that must be adapted by the end user to particular pit designs. One known mounting device used in meter pits is disclosed in Master Meter, Inc.'s "Dialog 3G" product line. The Dialog 3G Universal External Transmitter, for example, is detachably coupled to a mounting plate. The mounting plate may be installed by attaching it to a PVC pipe or a plastic stake with plastic tie wrap. Alternatively, the mounting plate may be attached to the meter by using screws to attach an L-shaped plastic mount to the meter; the L-shaped mount provides a vertical engagement surface for the mounting plate. An end user may use tie wrap to hang the mounting plate from a hole in the pit lid. The mounting plate may also be secured directly to the pit wall. It is up to the installer to adapt the mounting plate to a variety of pit configurations and environments in which the mounting plate may be used.

A pole or post mounting device is disclosed by Maddox in U.S. Pat. No. 6,568,645. This mounting device attaches to a steel conduit, which like a stake, may be inserted into a pit bottom and used to elevate an AMR device.

A pit lid may be large and/or heavy. For example, typical pit lids are made of cast iron. Such lids may range from one to three feet in diameter, and may range from 22-90 lbs in weight. AMR devices are often coupled to a meter or other AMR system component through one or more cables. Mounting or un-mounting an AMR device to a heavy and cumbersome meter lid may result in excessive strain or even damage to cables, connections, or the AMR device itself.

A lid mounting device is disclosed in U.S. Pat. No. 5,416,475. The mounting device includes an annular housing mounted within an outer shroud. The shroud sized to fit in the lid of a meter pit.

In order to mount AMR devices in a variety of meter pit environments, known devices are adapted for a single kind of application or they rely on the installer to customize the mounting to fit a variety of possible meter-pit configurations. Therefore a need exists to provide an improved AMR device for mounting in a meter pit environment. Furthermore, a need exists to provide an improved AMR device for mounting on a meter pit lid.

SUMMARY OF THE INVENTION

One aspect of the invention is directed to an automatic meter reading (AMR) system device adapted to be mounted in a utility meter pit. The device includes a housing constructed to at least partially enclose at least one portion of an AMR system device. The housing is integrally formed with at least two different mounting members selected from among: a rod mounting member that includes a port sized and shaped to receive a rod to facilitate mounting of the device in the pit, a wall mounting member that includes a wall-mount provision that facilitates mounting of the device to a wall of the pit, a tie mounting member constructed to receive at least one tie fastener that facilitates mounting of the device to a structure in the pit, and a lid mounting portion constructed to facilitate mounting of the device to a lid of the pit.

A method of making an Automatic Meter Reading (AMR) system device to be located in a utility meter pit according to another aspect of the invention includes forming a housing constructed to at least partially enclose at least one portion of an AMR system device. The method further includes forming at least two mounting portions integral to the housing selected from among: a rod mounting member including a port sized and shaped to receive a rod to facilitate mounting of the device in the utility meter pit, a tie mounting member constructed to receive at least one tie fastener that facilitates mounting of the device to a structure in the utility meter pit, and a wall mounting member that includes a wall-mount provision that facilitates mounting of the device to a wall of the utility meter pit.

According to another aspect of the invention, a method of installing an Automatic Meter Reading (AMR) system device in a utility meter pit includes selecting a mounting portion from among: a rod mounting member formed integrally with a housing of an AMR system device that includes a port sized and shaped to receive a rod to facilitate mounting of the device in a pit, a tie mounting member formed integrally with the housing constructed to receive at least one tie fastener that facilitates mounting of the device to a structure in the pit, a wall mounting member formed integrally with the housing that includes a wall-mount provision that facilitates mounting of the device to a wall of the pit, and a lid mounting member constructed to facilitate mounting of the device to a lid of the pit. The method further includes securing, using the previously selected mounting portion, the AMR system device in a utility meter pit.

Another aspect of the invention is directed to a mounting assembly for mounting an AMR system device to a lid of a utility meter pit containing a utility meter connected to the AMR system device via a cable assembly. The mounting assembly includes at least one retention portion constructed to be situated below a top surface of the lid and mechanically coupled to the lid, such as with the use of an upper portion situated at the top surface of the lid and a connecting portion passing through an aperture in the lid and connecting to the at least one retention portion, for example. The retention portion is constructed to be coupled to a housing of the AMR system device such that the AMR device is detachably secured to the lid. The retention portion is further constructed such that an amount of force required to detach the AMR system device from the lid is less than a breaking strength of the cable assembly.

Accessing the AMR system device in the pit is facilitated by aspects of the invention. Contrary to conventional practice, the lid covering the pit can be raised without the need for particular care in preserving the cable. The AMR system device is detachably secured to the lid. Raising the lid is performed such that a tension force is applied to the cable connecting the device to the utility meter below. The device will break away from the lid since the break-away force is less than a breaking strength of the cable. Once the lid has been removed, the AMR system device can be retrieved from the interior the pit accessed via the top opening of the pit.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE EMBODIMENTS

A mounting system for installing an AMR device in a utility meter pit according to one aspect of the invention includes multiple structures for securing the AMR device to objects found in a meter-pit environment. These structures include a rod-receiving member, members that facilitate mounting the AMR to a wall, members that facilitate wrapping of band, such as ties, around the AMR, and a member that may be detachably secured to a meter-pit lid.

Figure 1:
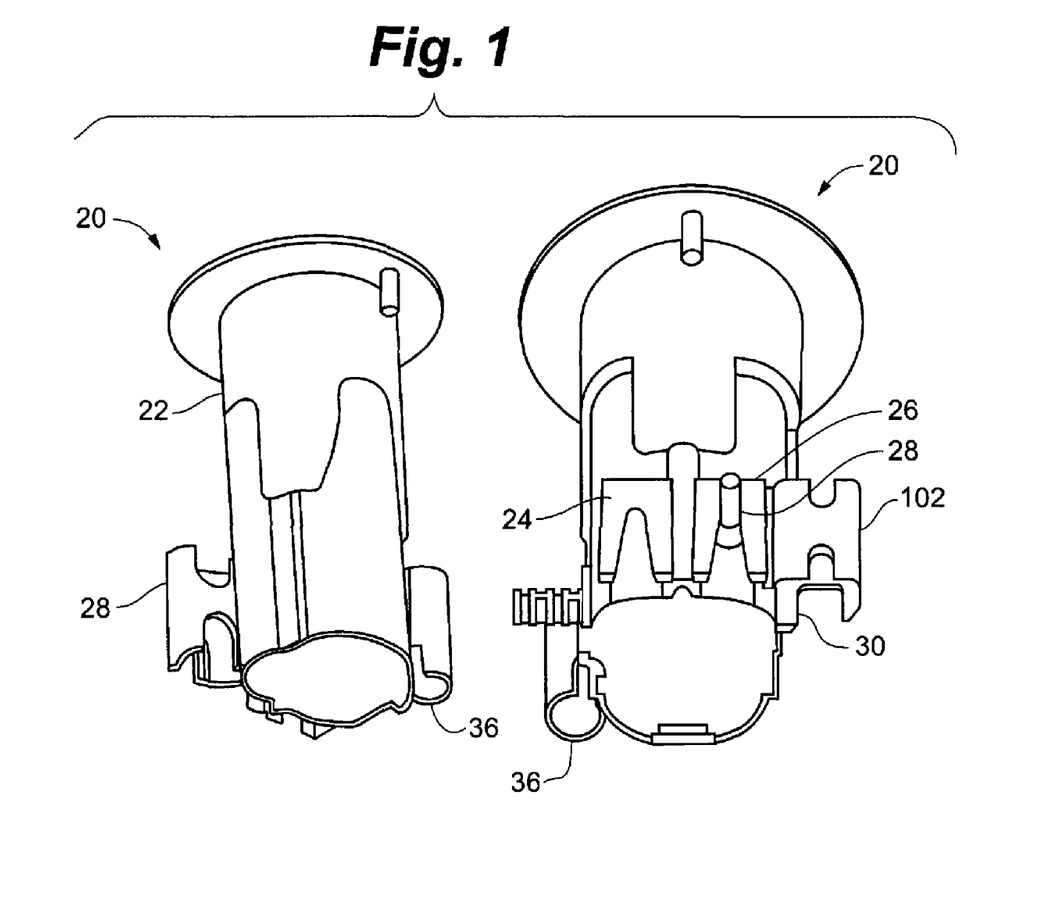
FIG. 1 illustrates generally one embodiment an AMR device according to one aspect of the invention from two angles.

FIG. 1 illustrates generally two views of one embodiment of device 20 including multiple mounting members. In one embodiment, device 20 includes a housing constructed to at least partially enclose at least one portion of an AMR system device. In various embodiments, device 20 includes a transmitter, receiver, or both for communicating with an AMR system. According to the embodiment shown in FIG. 1, device 20 includes lid mount 22, first wall mount 24, second wall mount 26, third wall mount 28, tie mount 30, and rod mount 36. In various embodiments, the housing of device 20 is integrally formed with at least two different mounting members selected from the group consisting of: a rod mounting member, a wall mounting member, a tie mounting member, and a lid mounting member. In one embodiment, the at least two different mounting members are molded with the housing of device 20.

In one embodiment, a method of making device 20 is disclosed herein. According to this embodiment, the method includes forming a housing constructed to at least partially enclose at least one portion of AMR system device 20. In an embodiment, the method includes forming at least two mounting portions integral to the housing selected from the group consisting of: a rod mounting member, a wall mounting member, a tie mounting member, and a lid mounting member. In one embodiment, the method includes molding the at least two mounting portions with the housing.

In one embodiment, the method further includes forming the at least one wall mounting portion includes forming a wall mount portion selected from the group consisting of: a first wall mount portion constructed to engage with a protrusion on the wall of a utility meter pit, a second wall mount portion constructed to engage with a recess on the wall of a utility meter pit, and a third wall mount portion adapted to engage with at least one affixation device such that device 20 may be mounted on the wall of a utility meter pit.

In one embodiment, a method of installing AMR device 20 in a utility meter pit is disclosed herein. According to this embodiment, the method includes electing a mounting portion from a group consisting of: at least one rod mounting member formed integral to a housing of an AMR system device that includes a port sized and shaped to receive a rod to facilitate mounting of the device in a pit; a tie mounting member formed integral to the housing of constructed to receive at least one tie fastener that facilitates mounting of the device to a structure in the pit, a wall mounting member formed integral to the housing that includes a wall-mount provision that facilitates mounting of the device to a wall of the pit, and a lid mounting member constructed to facilitate mounting of the device to a lid of the pit. In one embodiment, the method further includes securing, using the selected mounting portion, the AMR system device in a utility meter pit.

Figure 2:
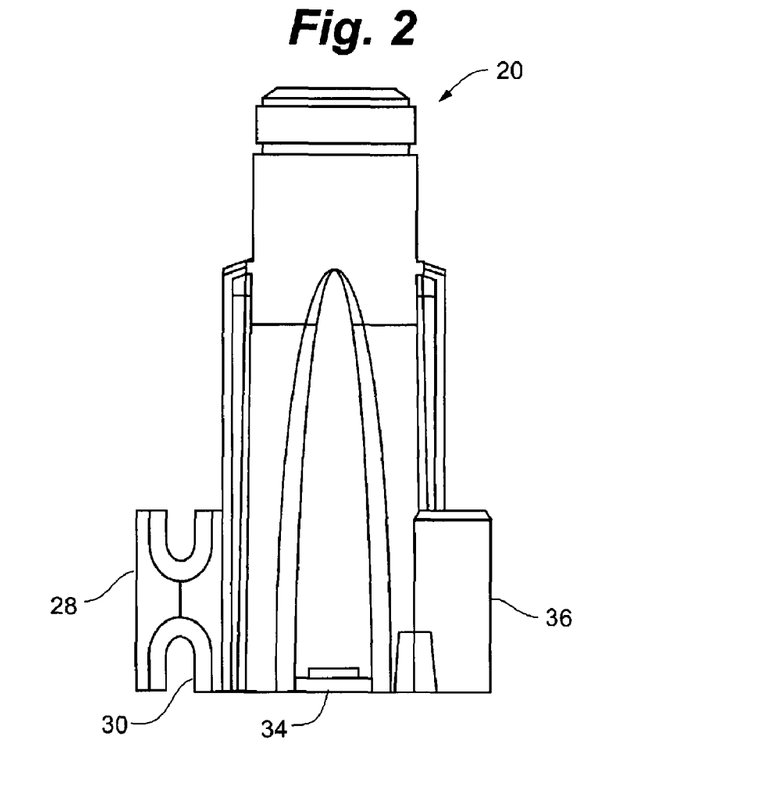
FIG. 2 illustrates generally an elevational view of one embodiment of an AMR device according to one aspect of the invention.
Figure 3:
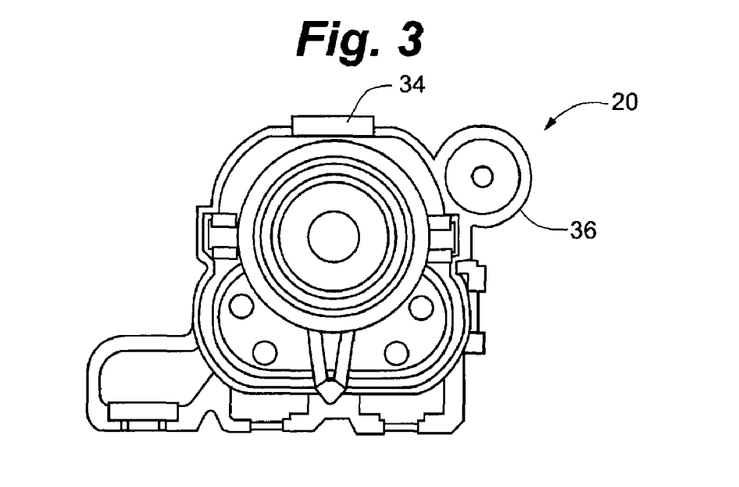
FIG. 3 illustrates generally a top down view of one embodiment of an AMR device according to one aspect of the invention.

FIGS. 2 and 3 illustrate generally one embodiment of device 20 with the lid mount 22 removed. According to the embodiment illustrated in FIG. 2, device 20 includes tie mount 30. In various embodiments, tie mount 30 is constructed to present a guide such that a tie may be used to securely affix device to a pole, pipe, or other structure. In one embodiment, tie mount 30 is constructed to receive at least one tie fastener that facilitates mounting of device 20 to a structure in a utility meter pit. In various embodiments, a tie fastener is any device capable of wrapping around device 20 and a pole, pipe, or other structure such that device 20 may be secured. In various embodiments, a tie includes an affixation portion. In one embodiment, device 20 further includes tie-support member 34. Tie-support member 34 is constructed to provide an additional guide such that a tie fastener may be used to securely affix device 20 to a pole, pipe, or other structure. In other various embodiments, tie-support member 34 is adapted to receive and/or maintain a position of an affixation portion of a tie fastener. In various embodiments, device 20 further includes at least one mating surface. According to these embodiments, the mating surface is sized and shaped such that device 20 may be more securely affixed to a pole, pipe, or other structure. In one embodiment, the at least one mating surface of device 20 is an arcuate surface sized and shaped such that device 20 may be more securely affixed to a pole or pipe. The mating surface may be sized and shaped to be affixed to a pole or pipe of a particular size. In one embodiment, the mating surface may be sized and shaped to be more securely affixed to a planar structure such as a board. According to this embodiment, the mating surface is a flat surface.

FIG. 3 illustrates an alternative view showing one embodiment of tie-support member 34 extending from device 20. FIG. 3 also shows one embodiment where rod mount 36 extends from device 20. In one embodiment, rod mount 36 includes a port sized and shaped to receive a rod to facilitate mounting of device 20 in a utility meter pit.

Figure 4:
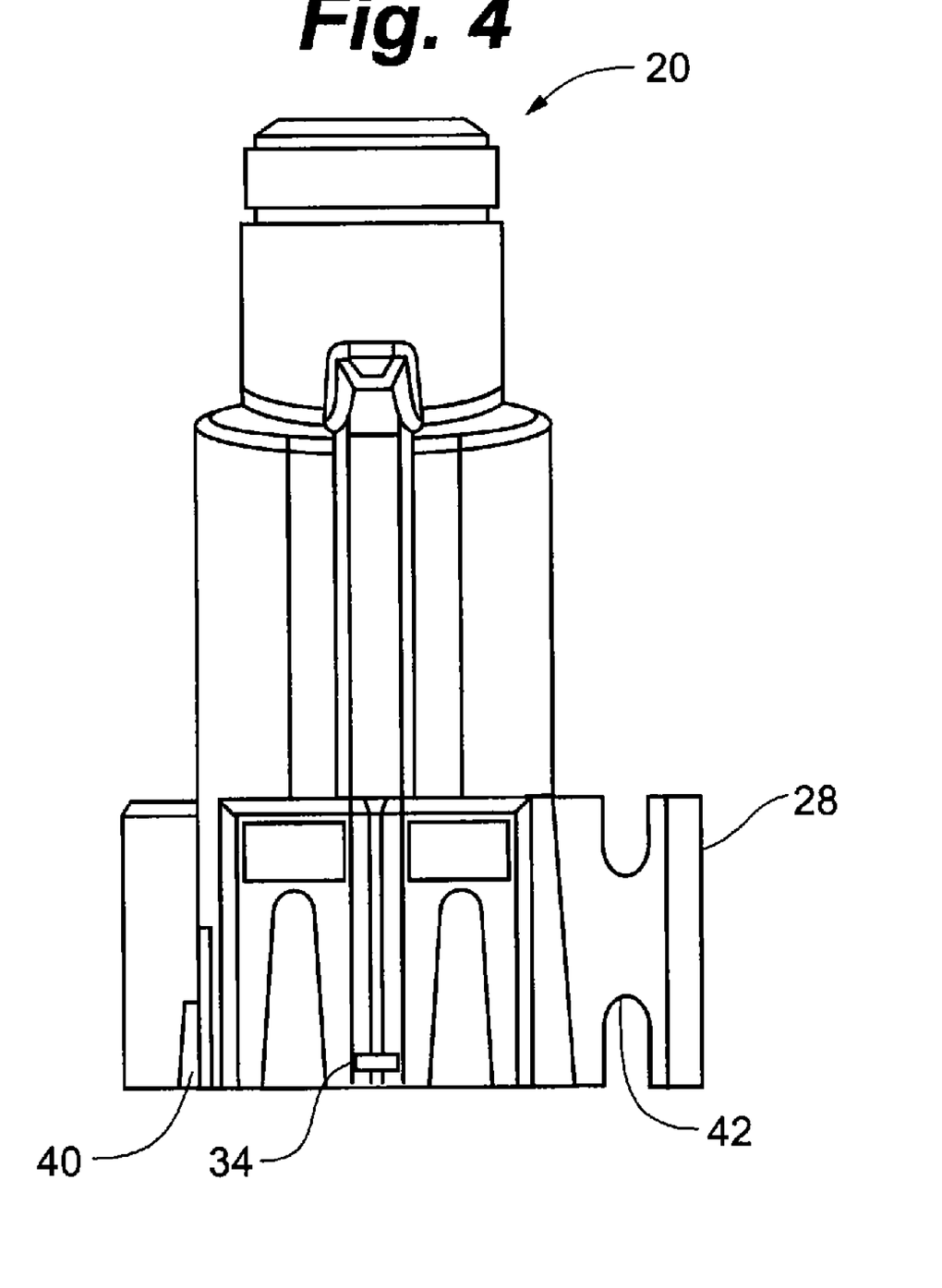
FIG. 4 illustrates generally an elevational view of an embodiment an AMR device according to one aspect of the invention.

FIG. 4 shows one embodiment of device 20 (without lid mount 22) and additional tie-support member 38. According to the embodiment illustrated in FIG. 4, rod mount 36 includes a gap 40 constructed such that a tie fastener may be wrapped around device 20 without extending around rod mount 36. According to the embodiment illustrated in FIG. 4, wall mount 28 includes lower recess 42. In one embodiment, lower recess of wall mount 28 also serves as tie mount 30. In one embodiment, tie mount 30 is positioned generally in line with gap 40 and tie-support member 34. In one embodiment, lower recess 42 of wall mount 28 is positioned generally in line with gap 40 and tie-support member 34.

Figure 5:
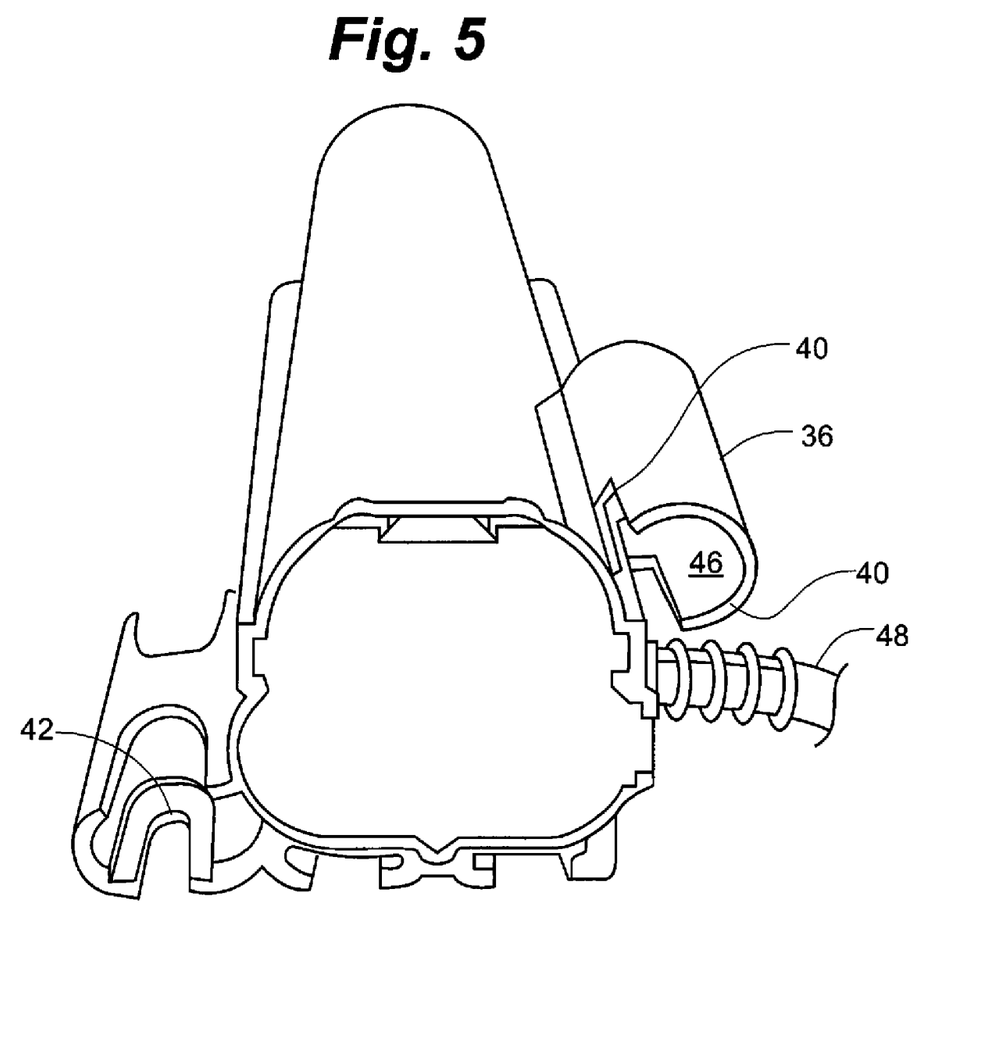
FIG. 5 illustrates generally an alternative view of an embodiment an AMR device according to one aspect of the invention.

FIG. 5 is a view looking up from below of one embodiment of device 20. According to this embodiment, lower recess 42 of third wall mount 28 serves as tie mount 30. The embodiment illustrated in FIG. 5 includes wall mount 28, and gap 40. In one embodiment, lower recess 42 of wall mount 28 is in line with gap 40 and tie support member 34.

The embodiment illustrated in FIG. 5 further includes cable 48. In various embodiments, cable 48 is positioned such that a lower portion of cable 48 is in line with lower recess 42 of wall mount 28, gap 40, and tie-support member 34. In one embodiment, cable 48 is position to provide additional guidance and/or support when a tie fastener is used to affix device 20. In another embodiment, cable 48 is not positioned in line with lower recess 42 of wall mount 28, gap 40, and tie-support member 34 such that cable 48 is isolated to prevent cable 48 from being damaged or disturbed.

The embodiment illustrated in FIG. 5 further includes rod mount 36. According to this embodiment, rod mount 36 includes cavity 46. In various embodiments, cavity 46 is constructed to receive a rod or other structure such that device 20 may be mounted in an elevated fashion.

Figure 6:
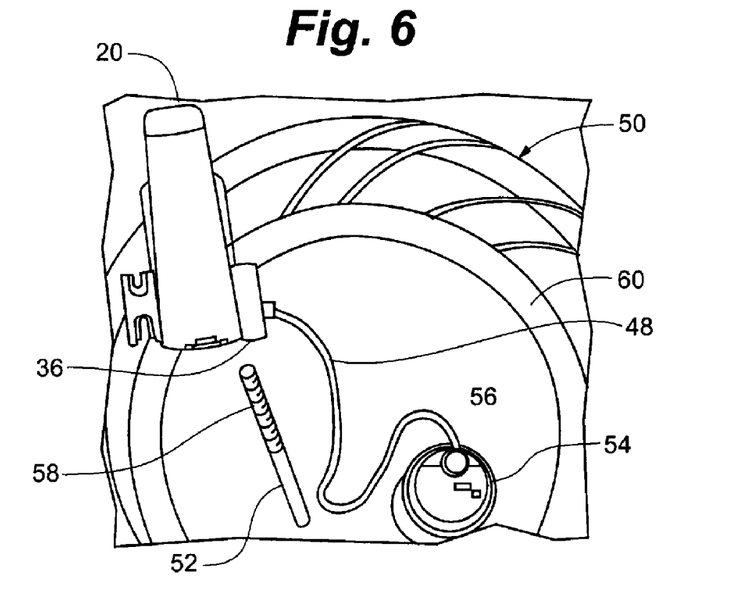
FIG. 6 illustrates generally one embodiment of an AMR device being installed on a rod-mount structure according to one aspect of the invention.

FIG. 6 shows one embodiment of device 20, meter pit 50, and rod 52. Rod 52 includes upper portion 58. Meter pit 50 includes pit walls 60, and pit floor 56. According to the embodiment illustrated in FIG. 6, rod 52 is embedded in pit floor 56. In one embodiment, rod 52 is embedded in pit floor 56 such that device 20 is elevated from pit floor 56. In one embodiment, cable 48 operable couples device 20 to utility meter 54.

In various embodiments, at least one portion of rod mount 36 is sized and shaped such that rod 52 may be inserted into or through at least one portion of rod mount 36. In one embodiment, rod mount 36 may include an enclosed upper portion such that device 20 may be positioned so that rod mount 36 encloses the upper portion 58 of rod 52. In one embodiment, rod mount 36 does not include an enclosed upper portion. According to this embodiment, rod 52 is adapted to extend through rod mount 36. In various embodiments, rod mount 36 is adapted to be secured to rod 52. Rod mount 36 may be adapted to be secured to rod 52 by any means known in the art, including, for example, at least one: screw, nail, glue, bolt, tie, or mating affixation mechanism. In one embodiment, upper portion of rod 52 and rod mount 36 are threaded such that rod mount 36 may be affixed to rod 52. In various embodiments, rod mount 36 may be adapted such that the elevation of device 20 is selectable to enhance the ability of device 20 to send or receive wireless communications.

Figure 7:
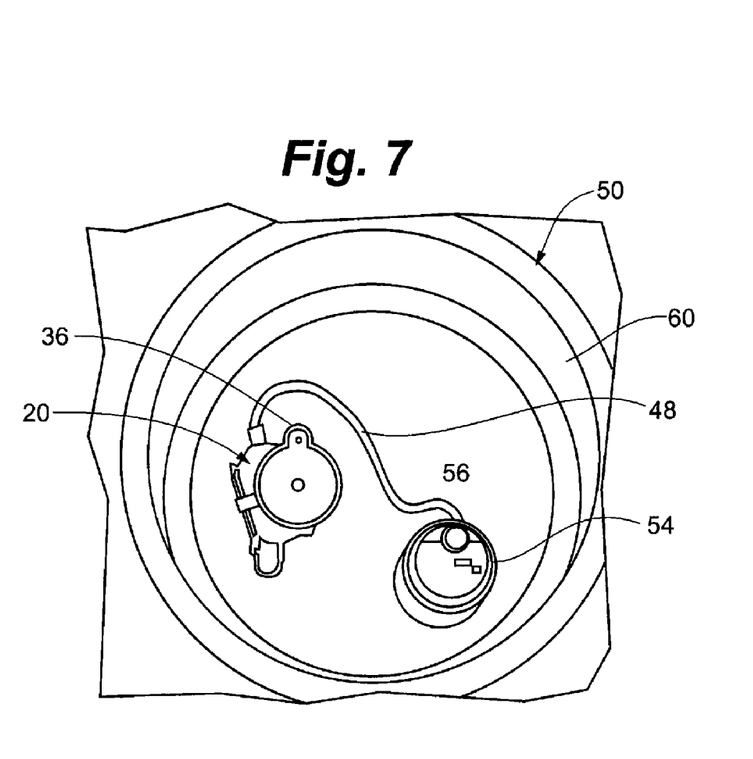
FIG. 7 illustrates generally one embodiment of an AMR device installed using a rod mount according to one aspect of the invention.

FIG. 7 illustrates generally one embodiment with device 20 installed using rod mount 36. In one embodiment, cable 48 operably couples device 20 to utility meter 54. According to this embodiment, device 20 is elevated by rod 52 such that device 20 does not contact meter pit walls 60.

Figure 13:
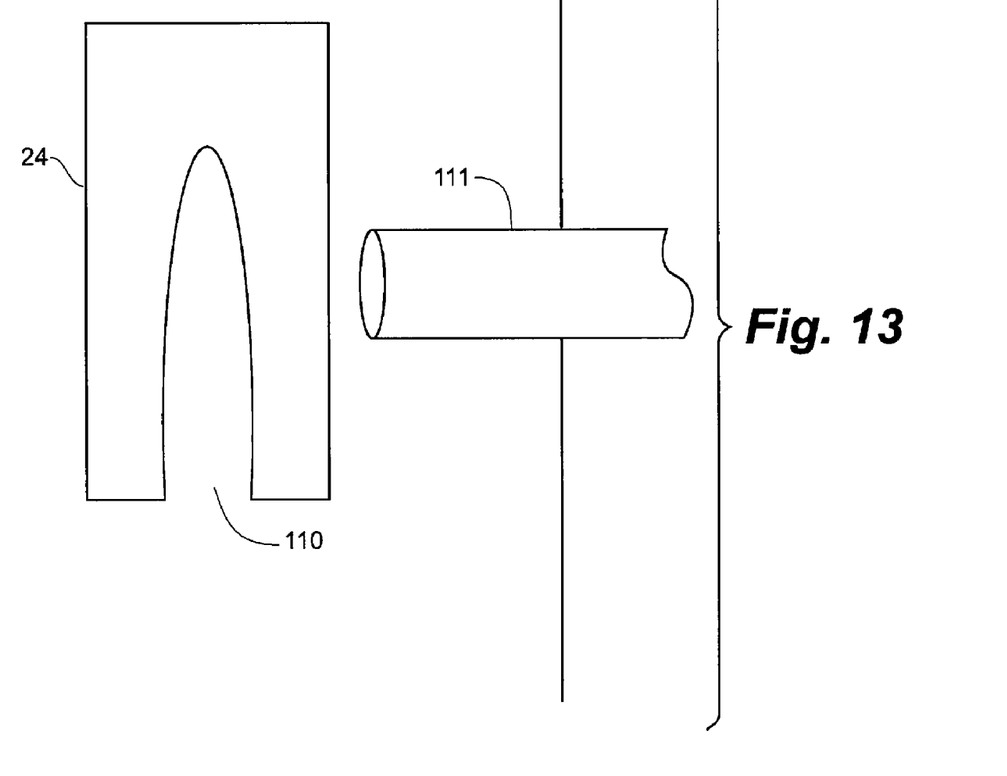
FIG. 13 illustrates generally one embodiment of a first wall mount according to one aspect of the invention.

In various embodiments, device 20 includes at least one wall-mount provision that facilitates mounting of device 20 to pit wall 60. FIG. 13 illustrates generally one embodiment of first wall mount 24. According to the embodiment illustrated in FIG. 13, first wall mount 24 is constructed to engage with a protrusion 81 from pit wall 60. In various embodiments, protrusion 111 is a nail, a screw, or any other protruding feature. In various embodiments, first wall mount 24 includes fitting portion 110. In various embodiments, fitting portion 110 is sized and shaped to fit over protrusion 111 such that device 20 may be secured to pit wall 60.

Figure 14:
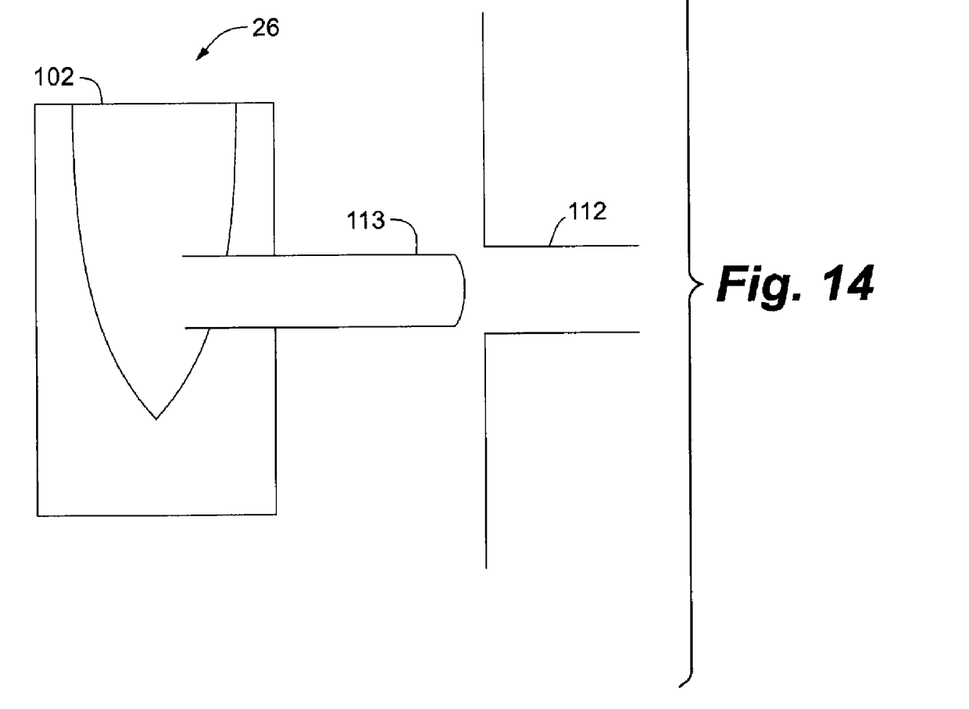
FIG. 14 illustrates generally one embodiment of a second wall mount according to one aspect of the invention.

FIG. 14 illustrates generally second wall mount 26. In various embodiments, second wall mount 26 is adapted to engage with recess in pit wall 60. In various embodiments, second wall mount 26 includes protrusion 113. In one embodiment, second wall mount 26 may be convertible between engaging with protrusion 111 or recess 112 in pit wall 60. According to this embodiment, second wall mount 26 includes a plug 102 that may be inserted or removed to convert second wall mount 26 between engaging with protrusion 111 or recess 112 in pit wall 60.

Figure 8:
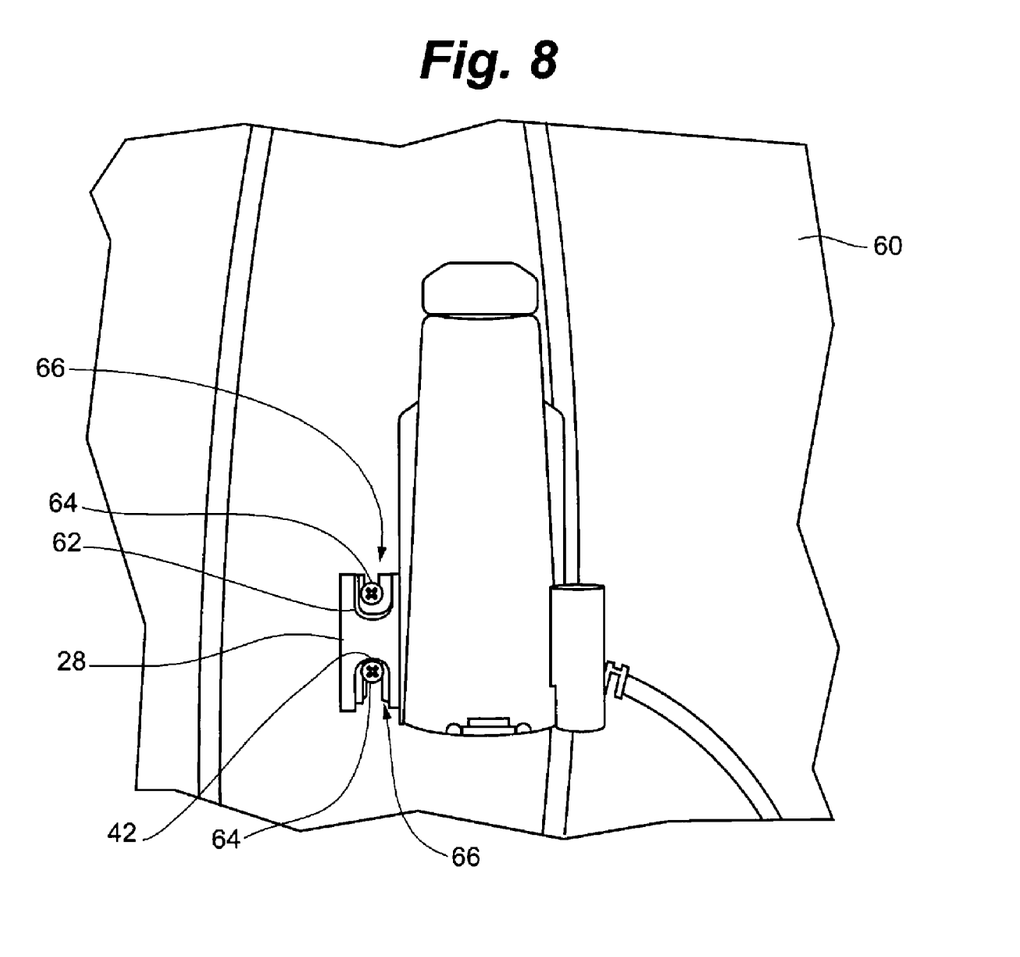
FIG. 8 illustrates generally one embodiment of an AMR device secured using a wall-mount structure.

FIG. 8 illustrates generally one embodiment of device 20 installed on meter-pit wall 60 using third wall mount 28. In one embodiment, third wall mount 28 includes a wall mount provision constructed to engage with at least one affixation device. In one embodiment, the affixation device is attachment member 64. According to the embodiment illustrated in FIG. 8, third wall mount 28 includes upper recess 62 and lower recess 42. In various embodiments, upper recess 62 and lower recess 42 are constructed such that the may be secured to pit wall 60 using at least one attachment member 64. In various embodiments, at least one attachment member 64 may be any suitable fastener for attaching device 20 to meter-pit wall 60. In various embodiments, attachment member is a screw, bolt or nail with sufficient length to hold device 20 against meter pit wall 60. In one embodiment, a head of the screw, bolt, or nail is sized and shaped to be larger than opening 66 defined by lower recess 42 or upper recess 62 so that third wall mount 28 is retained against meter pit wall 60 at least in part by attachment member 64. The embodiment of FIG. 8 shows multiple attachment members 64 in both upper and lower recesses 62, 42. In other embodiments, device 20 may also be secured with only one attachment member 64 using either lower recess 42 or upper recess 62.

Figure 9:
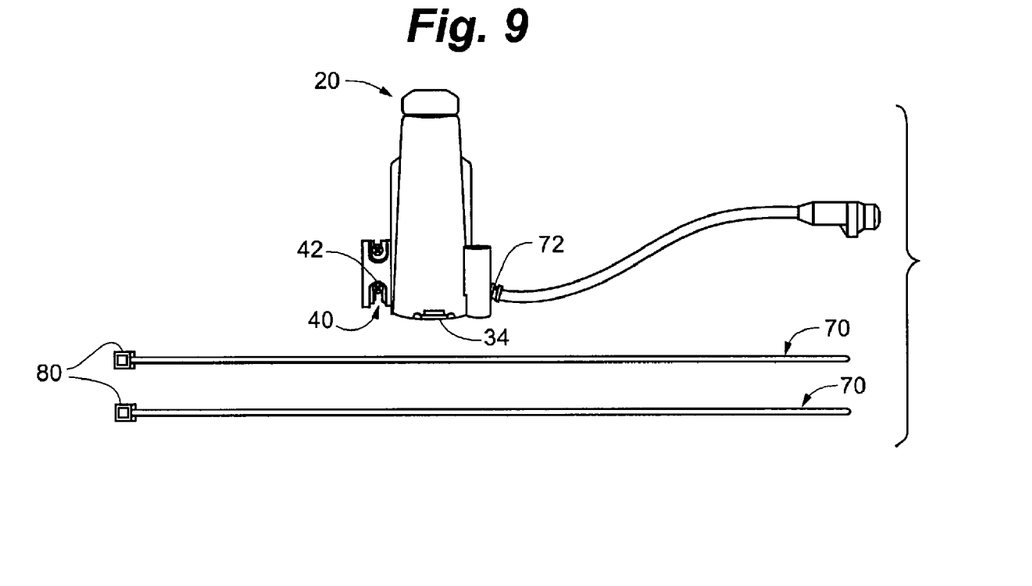
FIG. 9 illustrates generally one embodiment of an AMR device and tie-mount structures according to one aspect of the invention.

FIG. 9 illustrates generally one embodiment including device 20 and tie fasteners 70. In various embodiments, tie fasteners 70 may be made of any suitable material, such as nylon. In one embodiment, tie fasteners 70 further include at least one clasp mechanism 80. It is to be understood that tie fasteners 70 may be formed from a variety of other materials, such as polypropylene, Velcro, HALAR fluoropolymer, Tefzel fluoropolymer, weather resistant acetal, and stainless steel, or any other suitable material known in the art. In various embodiments, tie fasteners 70 are cable ties, clamp ties, marker-and-flag cable ties, push-mount ties, or parallel-entry ties. In one embodiment, a single tie fastener 70 may be positioned around tie support member 34, gap 40, and lower recess 42. In one embodiment, cable inlet 72 is positioned on device 20 so that tie fasteners 70 may pass around device 20 without obstruction from inlet 72. In one embodiment, cable inlet 72 may be positioned above the path of tie fastener 70 when tie fastener 70 is secured about device 20 through lower recess 42, proximate tie support member 34, and through gap 40.

Figure 10:
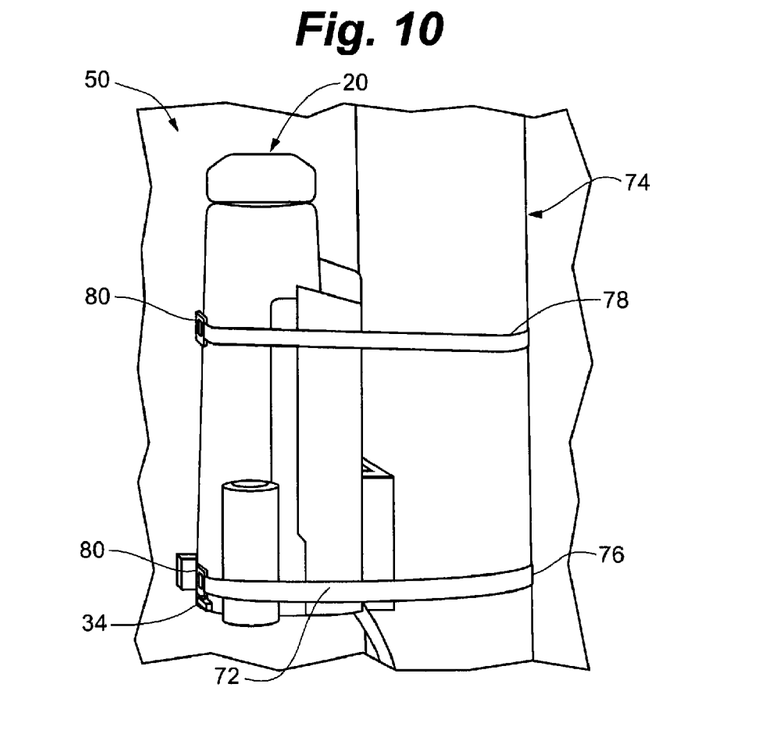
FIG. 10 illustrates generally one embodiment of an AMR device secured using tie-mount structures according to one aspect of the invention.

FIG. 10 illustrates generally one embodiment of device 20 secured to pipe 74 in meter pit 50 using tie fasteners 76 and 78. According to this embodiment, tie fastener 70 is positioned to pass under cable inlet 72, through gap 40, proximate to tie-support member 34, and through tie mounting member 30 (tie mounting member 30 is not shown in FIG. 10). According to the embodiment illustrated in FIG. 10, second tie fastener 78 is also employed to secure device 20 to pipe 74. In various embodiments not shown in FIG. 10, device 20 may include any combination of a second tie-support member or a second tie mounting member that are constructed to provide support for second tie fastener 78. In one type of embodiment, clasp mechanism 80 is be used to bind each of tie fasteners 76, 78 in position around device 20 and pipe 74. In one type of embodiment, tie-support member 34 is constructed to support and maintain a position of clasp mechanism 80 when device 20 is affixed to pipe 74.

Figure 11:
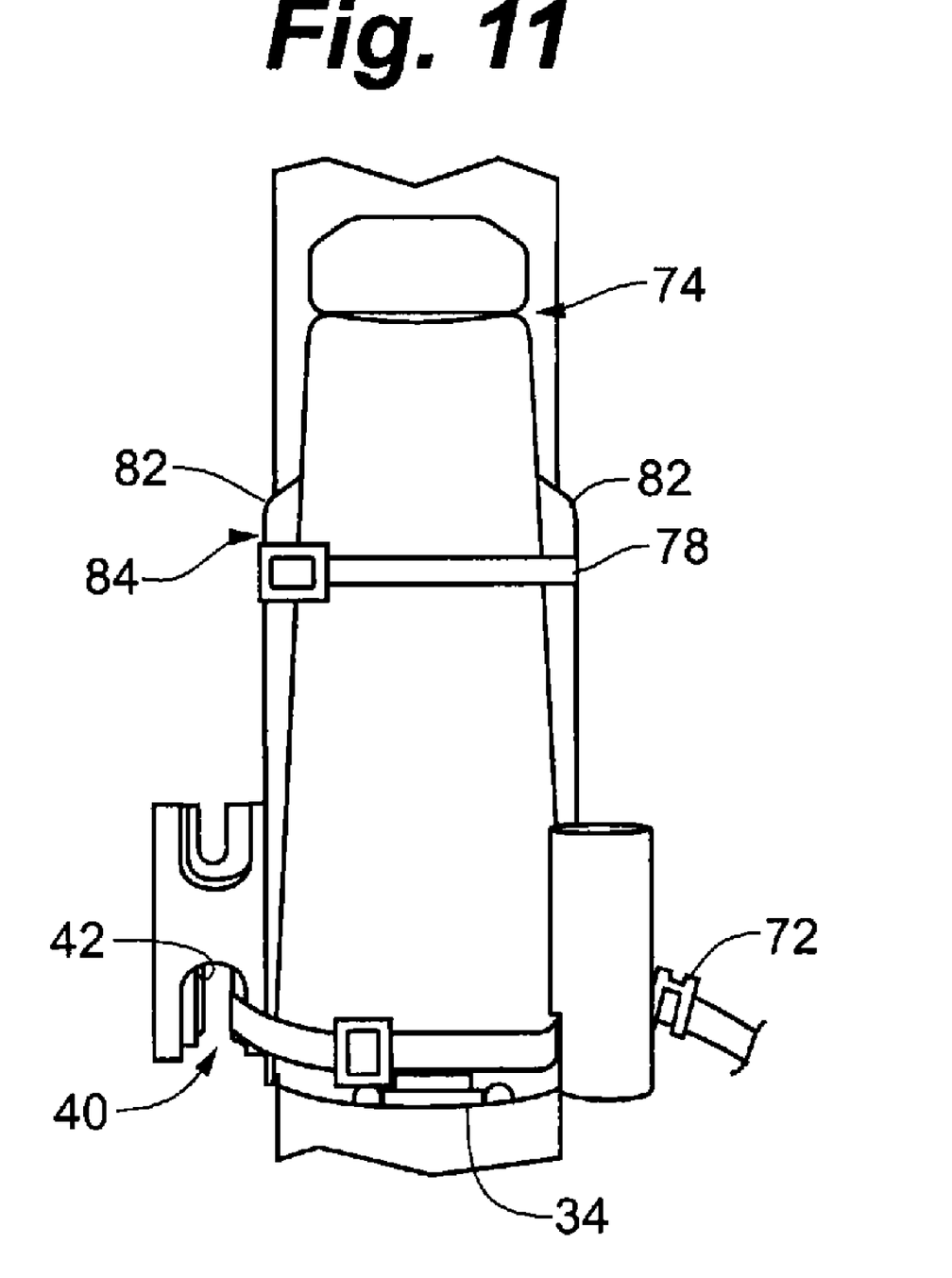
FIG. 11 illustrates generally an alternate view of one embodiment of an AMR device secured using tie-mount structures according to one aspect of the invention.

FIG. 11 illustrates generally one embodiment of device 20 secured to pipe 74 with first and second tie fasteners 76 and 78. According to this embodiment, device 20 includes extension members 82. Extension members 82 are constructed to provide a generally uniform periphery such that second tie fastener 78 may be securely affixed around device 20 and pipe 74. According to the embodiment illustrated in FIG. 11, second tie fastener 78 is secured around extension members 82 of device 20.

FIGS. 12 A-D illustrate generally one embodiment of lid mount 22. In various embodiments, device 20 includes at least one lid mounting portion constructed to facilitate mounting of device 20 to lid 88 of a utility meter pit. In one embodiment, the at least one lid mounting portion of device 20 is constructed to be engageable with a corresponding mount secured to a bottom surface of lid 88. In one embodiment, the lid mounting portion is constructed to engage with a gripping portion of the corresponding mount that retains the lid mounting portion using a friction force.

In one embodiment, a mounting assembly is disclosed herein. According to this embodiment, the mounting assembly includes at least one retaining portion 90 constructed to be situated below a top surface of a lid 88 and mechanically coupled to lid 88. In an embodiment, the at least one retention portion 90 is further constructed to be coupled to a housing of device 20 such that the device 20 is detachably secured to the lid. In one embodiment, an amount of force required to detach device 20 from lid 88 is less than a breaking strength of cable assembly 48 coupled to device 20.

In one embodiment, the mounting assembly includes an upper portion constructed to be situated at a top surface of lid 88. In one embodiment, the mounting assembly includes a connecting portion coupled to the upper portion. The connecting portion may be sized and shaped to pass through at least one aperture in lid 88. In one embodiment, retention portion 90 is constructed to be mechanically coupled to the upper portion via the connecting portion.

In one embodiment, device 20 includes at least one recessed portion sized and shaped to rigidly interface with retention portion 90. In another embodiment, the retention portion includes at least one gripping portion constructed to frictionally interface with at least one exterior surface of device 20. In one embodiment, retention portion 90 includes a plurality of gripping arms arranged to grip around an exterior surface of device 20. In one embodiment, retention portion 90 is detachably secured to lid 88. In another embodiment, device 20 is detachably secured to retention portion 90.

Figure 12A:
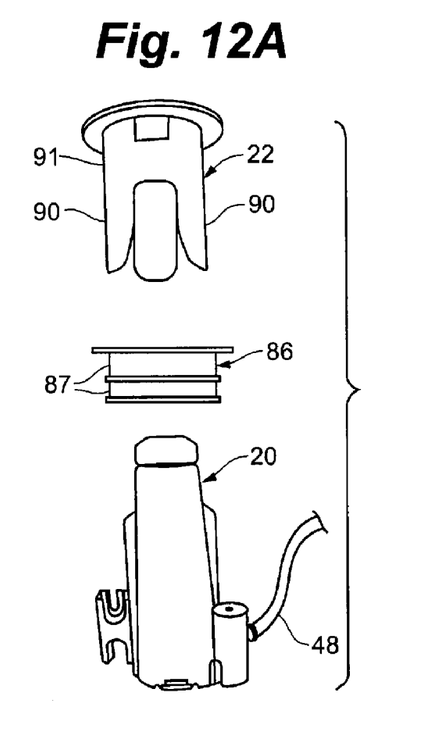
FIGS. 12A-D illustrate generally one embodiment of an AMR device including lid mount structures according to one aspect of the invention.

The embodiment illustrated in FIG. 12A includes device 20, lid mount 22, and collar 86. According to this embodiment, lid mount 22 includes retention portion 90 that retains device 20 by contact with the exterior of device 20. In one type of embodiment, retention portion 90 is a gripping portion that holds device 20 using friction. In one embodiment, retention portion 90 includes a plurality of gripping arms.

In the embodiment illustrated in FIG. 12A, collar 86 is constructed to interface with lid mount 22 to surround retention portion 90. In one embodiment, collar 86 is permanently affixed to lid mount 22 or, in the alternative, collar 86 is formed as part of lid mount 22. In various embodiments, collar 86 is adapted to be removably affixed to lid mount 22. In various embodiments, collar 86 is adapted to be affixed to lid mount 22 according to any affixation means known in the art. In one embodiment, collar is adapted to be affixed to lid mount 22 by a snap-fit or latch mechanism.

In various embodiments, collar 86 enhances the retention of device 20 between retention portion 90. In various other embodiments, lid mount 22 includes provisions for effectively retaining device 20 without collar 86 such as, for example, teeth or other horizontal protrusions, surface texture for increasing friction; an adhesive surface, or an elastomeric surface for increasing friction.

In the embodiment illustrated in FIG. 12A, collar 86 includes channels 87. According to these embodiments, channels 87 are adapted to provide a guide or mating portion for an affixation mechanism to affix secure collar 86 to lid mount 22. In one embodiment, tie fasteners are used to affix collar 86 to lid mount 22. According to this embodiment, channels 86 are adapted to guide and further secure tie fasteners used to affix collar 86 to lid mount 22.

Figure 12B:
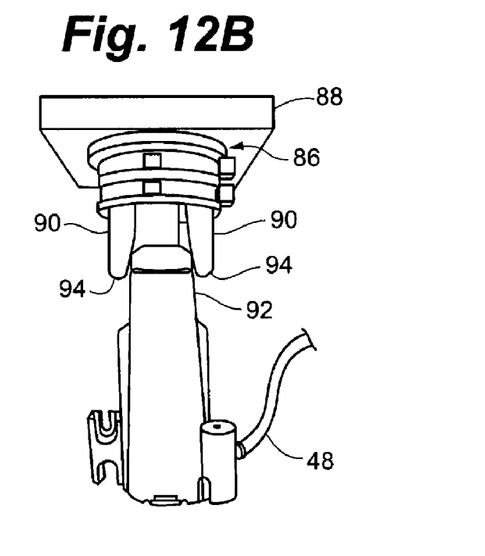

FIG. 12B illustrates generally lid mount 22 affixed to lid 88 of a utility meter pit. In one embodiment, lid mount 22 includes at least one portion that is engageable with a corresponding mount secured to a bottom surface of lid 88. In one embodiment, the corresponding mount is retention portion 90. In one embodiment, lid mount 22 is secured to pit lid 88 so that retention portion 90 is below lid 88. According to the embodiment illustrated in FIG. 12B collar 86, which may include channels 87, is positioned around upper portion 91 of retention portion 90. However, it is to be understood that embodiments that do not include collar 86 are within the scope of the invention.

In one embodiments, retention portion 90 and upper portion of device 92 are sized, shaped, and positioned such that device 20 may be secured to lid mount 22. In one embodiment, upper portion 92 of device 20 is constructed to interface with retention portion 90 such that device 20 may be secured to lid mount 22. In various embodiments, upper portion 92 of device 20 includes at least one recessed portion adapted to interface with retention portion 90. In some embodiments, lid mounting portion 92 of device 20 includes at least one groove or divot adapted to interface with retention portion 90. In one embodiment, device 20 is configured to slide into retention portion 90 by pressing the lid mounting portion 92 of device 20 against the lower portions 94 of retention portion 90. In various embodiments, retention portion 90 and lid mounting portion 92 are adapted to interface by any means known in the art.

In one embodiment, retention portion 90 and lid mounting portion 92 are constructed such that device 20 may be detachably secured to retention portion 90. In another embodiment, lid mount 22 is constructed such that lid mount 22 may be detachably secured to lid 88. In one embodiment retention portion 90 and lid mount 22 are constructed such that lid mount 22 may be detachably secured to lid 88 and device 20 may be detachably secured to retention portion 90.

In one embodiment, cable assembly 48 connects device 20 to a utility meter situated in the utility meter pit. According to this embodiment, an interface between lid mounting portion 92 and the corresponding mount is arranged such that an amount of force required to detach the lid mounting portion from the corresponding mount is less than a breaking strength of cable assembly 48.

In one embodiment, an amount of force required to detach device 20 from lid 88 is selected so that it is less than a breaking strength of cable assembly 48. In this embodiment, device 20 is protected from damage caused by lifting pit lid 88 such that cable assembly 48 is strained. By detaching from lid 88, device 20 and cable assembly 48 are not pulled with pit lid 88 as it is removed from meter pit 50. Pit lid 88 may be relatively heavy (over 20 lbs) and thus be awkward for service personnel to remove gently. In this embodiment, a detachable coupling relationship between device 20 and lid 88 helps to protect device 20 and cable 48 from inadvertent damage.

In one embodiment, a breaking strength of cable assembly 48 has a linear breaking strength generally in the range of 30-50 lbs. measured as a direct axial pull, or the equivalent of such a force in an indirect pull that may include a shearing force. According to this embodiment, the force required to detach device 20 from lid 88 is selected to be less than the linear breaking strength of cable assembly 48. Within this limit, the amount of force required to detach device 20 from lid 88 may vary, for example, in the range of 5-10 lbs., depending on the shape of retention portion 90, the shape of the upper portion 92 of device 20, and the material used for their construction.

Figure 12C:
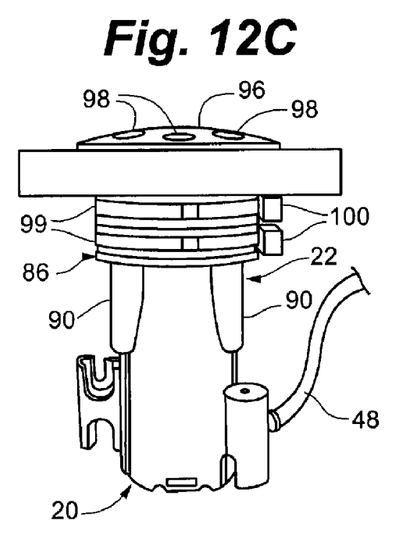

FIG. 12C illustrates one embodiment of device 20 secured to lid 88 using lid mount 22. According to this embodiment, top portion 96 of lid mount 22 is constructed to be placed above meter pit lid 88 and includes lid affixation portions 98. In various embodiments, lid affixation portions 98 are adapted such that lid mount 22 may be affixed to lid 88. In one embodiment, lid affixation portions 98 are one or more screws or bolts. According to this embodiment, lid 88 includes at least one aperture, and the one or more screws or bolts are adapted to extend through the aperture to secure lid mount 22 to lid 88. In one embodiment, lid affixation portions 98 are one or more apertures. According to this embodiment, lid affixation portions 98 are adapted to receive at least one affixation device such that lid mount 22 may be affixed to lid 88.

Figure 12D:
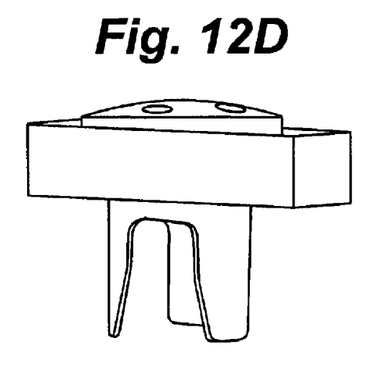

In some embodiments, device 20 is detachably coupled to retention portion 90. In one embodiment, as shown in FIG. 12D, device 20 may be detached from lid mount 22. In one embodiment, detaching device 20 includes detaching collar 86.

In use, device 20 couples a utility meter to an AMR system. For example, device 20 may include an RF transceiver communicatively coupled to an AMR system. In one embodiment, data from a utility meter is provided to device 20 by cable 48. In an alternative embodiment, communication between device 20 and other AMR system components may be made wireless communication, such as by an RF transmitter operably coupled to utility meter 54.

The multiple mounting members of device 20 allow installation in a variety of pit-meter environments. In one embodiment, where contact with meter pit walls 60 is undesirable— as when meter pit walls 60 are metallic or may otherwise interfere with RF transmissions—rod mount 36 may be used together with rod 52 to install device 20 in a meter pit as shown in FIGS. 6 and 7. In an embodiment of the invention where rod mount 36 is used, upper portion 58 of device 20 may be positioned 1"-3" below the opening 100 of pit lid 88 to optimize RF transmission and reception.

In various embodiments, where pit walls 60 are concrete or other material whose proximity does not unduly interfere with RF transmissions, one or more of wall mounts 24, 26, or 28 may be used to attach device 20 to the wall of meter pit 60. First wall mount 24 fits over a protrusion in pit wall 60. Second wall mount 26 can be used like first wall mount 24 or used with plug 102 inserted, which allows second wall mount 26 to be placed in a recess in pit wall 60. Third wall mount 28 includes upper and lower recesses 62, 42, which permit installation of device 20 by way of attachment devices such as screws or nails.

In one embodiment, where a pipe or other structure traverses a portion of the pit 50 interior, device 20 may be secured to pipe 74 or other structure as shown in FIGS. 10-11. In one embodiment, device 20 may be positioned close to pit lid 88 to improve RF performance. Ties 76, 78 are used in this embodiment to bind device 20 to pipe 74. The geometry of device 20 allows first tie 76 and second tie 78 to pass around and secure device 20.

In one embodiment, when mounting device 20 to a utility-meter pit lid 88 is desirable, lid mount 22 may be used to secure device 20 to pit lid 88. In one embodiment, a hole is made in pit lid 88 sized to fit the periphery of retention portion 90. Lid mount 22 is then fitted into the hole. Device 20 is attached to retention portion 90, which may be sized to receive the upper portion 92 of device 20 when a small amount of force is applied, such as can be applied manually. In one embodiment, collar 86 is constructed enhances the retention of device 20 by retention portion 90. Alternatively, retention portion 90 can receive device 20 without applied force. According to this embodiment, collar 86 acts to retain device 20. In various embodiments, a pulling force on pit lid 88 suffices to detach device 20 from retention portion 90 without damaging device 20.

Device 20 may be constructed so that mounting members including rod mount 36, first, second, and third wall mounts 24, 26, and 28, and tie mount 30 are integrally formed, such as by molding. Alternatively, one or more of these mounting members may be formed separately and attached to device 20. Lid mount 22 may be formed separately and thus made detachable from device 20. Where detachability is not desired, lid mount 22 may be integrally formed or attached to device 20 such that the force required to separate lid mount 22 from device 20 is greater than the breaking strength of cable 48.

Although the embodiments shown in FIGS. 1-14 include four or more mounting members, device 20 may be constructed with fewer or more multiple mounting members, depending on the intended use.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automatic meter reading (AMR) system device adapted to be mounted in a utility meter pit, the device comprising:
   a housing constructed to at least partially enclose at least one portion of an AMR system device, wherein the housing is integrally formed with at least two different mounting members selected from among:
      a rod mounting member that includes a port sized and shaped to receive a rod to facilitate mounting of the device in the pit;
      a wall mounting member that includes a wall-mount provision that facilitates mounting of the device to a wall of the pit;
      a tie mounting member constructed to receive at least one tie fastener that facilitates mounting of the device to a structure in the pit; and
      a lid mounting portion constructed to facilitate mounting of the device to a lid of the pit.

2. The device of claim 1, wherein the at least two different mounting members are molded with the housing.

3. The device of claim 1, wherein the lid mounting portion includes at least one portion that is engageable with a corresponding mount secured to a bottom surface of the lid.

4. The device of claim 3, wherein the lid mounting portion engages with a gripping portion of the corresponding mount that retains the lid mounting portion using a friction force.

5. The device of claim 3, further comprising:
   a cable assembly connecting the device to a utility meter situated in the pit, wherein an interface between the lid mounting portion and the corresponding mount is arranged such that that an amount of force required to detach the lid mounting portion from the at corresponding mount is less than a breaking strength of a cable assembly.

6. The device of claim 1, wherein the wall mounting member includes at least one provision from among:
   a wall-mount provision constructed to engage with a protrusion on the wall of the utility meter pit;
   a wall-mount provision constructed to engage with a recess in the wall of the utility meter pit; and
   a wall-mount provision constructed to engage with at least one affixation device.

7. The device of claim 6, wherein the at least one affixation device is a screw.

8. The device of claim 6, wherein the at least one affixation device is a nail.

9. A method of making an Automatic Meter Reading (AMR) system device to be located in a utility meter pit, comprising:
   forming a housing constructed to at least partially enclose at least one portion of an AMR system device;
   forming at least two mounting portions integral to the housing selected from among:
      a rod mounting member that includes a port sized and shaped to receive a rod to facilitate mounting of the device in a utility meter pit;
      a tie mounting member constructed to receive at least one tie fastener that facilitates mounting of the device to a structure in the utility meter pit; and
      a wall mounting member that includes a wall-mount provision that facilitates mounting of the device to a wall of the utility meter pit.

10. The method of claim 9, wherein forming the at least one wall mounting portion comprises forming a wall mount portion selected from the group consisting of:
   a first wall mount portion constructed to interface with a protrusion on the wall of the utility meter pit such that the AMR system device may be mounted on the wall of the utility meter pit;
   a second wall mount portion constructed to interface with a recess in the wall of the utility meter pit such that the AMR system device may be mounted on the wall of the utility meter pit.
   a third wall mount portion adapted to interface with at least one affixation device such that the AMR system device may be mounted on the wall of a pit.

* * * * *